(12) United States Patent
Osawa et al.

(10) Patent No.: US 6,710,821 B1
(45) Date of Patent: Mar. 23, 2004

(54) WHITE BALANCE ADJUSTING APPARATUS

(75) Inventors: Ikuo Osawa, Osaka (JP); Takemi Beppu, Osaka (JP); Kenichi Nakajima, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/344,751

(22) Filed: Jun. 25, 1999

(30) Foreign Application Priority Data

Jun. 26, 1998 (JP) .......................................... 10-180630
Jun. 29, 1998 (JP) .......................................... 10-182383

(51) Int. Cl.$^7$ ................................................ H04N 9/73
(52) U.S. Cl. ...................... 348/656; 348/655; 348/687; 348/673; 348/223.1
(58) Field of Search ................................ 348/656, 655, 348/687, 673, 677, 689, 690, 691, 692, 705, 706, 603, 223.1, 379, 377, 181, 189, 190; 345/690, 204, 63, 77

(56) References Cited

U.S. PATENT DOCUMENTS

| | | | | |
|---|---|---|---|---|
| 4,044,375 A | * | 8/1977 | Norman | 348/673 |
| 4,633,145 A | * | 12/1986 | Osawa et al. | 315/383 |
| 4,930,004 A | * | 5/1990 | Yamamoto et al. | 348/658 |
| 5,164,820 A | * | 11/1992 | Jeon et al. | 348/655 |
| 5,504,538 A | * | 4/1996 | Tsujihara et al. | 348/673 |
| 5,663,770 A | * | 9/1997 | Yamade | 348/656 |
| 6,097,445 A | * | 8/2000 | Goto et al. | 348/655 |
| 6,249,323 B1 | * | 6/2001 | Van Der Voort | 348/655 |
| 6,281,943 B1 | * | 8/2001 | Kim | 348/656 |

* cited by examiner

*Primary Examiner*—John Miller
*Assistant Examiner*—Jean W. Désir
(74) *Attorney, Agent, or Firm*—Fish & Richardson P.C.

(57) ABSTRACT

A white balance adjusting apparatus includes a test signal source 13 for generating a black signal for testing and a white signal for testing, a first impedance means 1 for converting currents flowing through three drive transistors for amplifying primary color R, G, B signals into voltages, a second impedance means 5 connected in parallel with the first impedance means, a switch 6 which is selectively closed to flow a current through the second impedance means, a reference voltage source 7 for generating a first reference voltage at the time of performing the cut-off adjustment and a second reference voltage at the time of performing the drive adjustment, a comparator 8 for comparing the levels between the reference voltages of the reference voltage sources and the output voltage converted by the first or second impedance means, and a microcomputer 75 which generates a control signal for adjusting the white balance on the basis of the output signal of the comparator and adjusts the DC level and the AC level of each of the primary colors of R, G, B.

10 Claims, 3 Drawing Sheets

WHITE BALANCE ADJUSTING APPARATUS

BACKGROUND OF THE INVENTION

1. Field of the Invention

The present invention relates to a white balance adjusting apparatus for accurately displaying a luminance signal on a television receiver or a computer display unit using a cathode ray tube and, more particularly, relates to a white balance adjusting apparatus which is suitable for being formed in an integrated-circuit and can easily adjust the white balance in a manufacturing line.

2. Description of the Related Art

The television receivers and computer display units are subjected to the white balance adjustment in the manufacturing line thereof. The white balance adjustment methods include the cut-off adjustment for adjusting the balance among red, green and blue (RGB) at faintly brightening dark level (black signal) and the drive adjustment for adjusting the balance among red, green and blue at strongly brightening brightness level (white signal).

The cut-off adjustment means the adjustment of DC levels (biases) of RGB output signals, while the drive adjustment means the adjustment of AC levels (gains) of RGB output signals.

A method for adjusting the white balance in a simple manner has been considered. For example, each of the red, green and blue may be adjusted in a manner that each color is brightened independently, then a beam current (IK) of the brightened beam of the color is detected and then adjustment of the color is performed. The beam current (IK) represents the cathode current of each of the primary colors of the red, green and blue.

The method for adjusting the white balance in a simple manner also performs the cut-off adjustment and the drive adjustment. An amount of the beam current (IK) largely differs between the cut-off adjustment and the drive adjustment. For example, the beam current flowing at the time of the cut-off adjustment is 25 microampere, whilst the beam current flowing at the time of the drive adjustment is about 3.5 milli-ampere.

Thus, a dedicated input circuit and a dedicated discrimination circuit are required for each of the cut-off adjustment and the drive adjustment.

However, in this case, there arises a problem that the requirement of the dedicated input and discrimination circuits for each of the cut-off adjustment and the drive adjustment results in the increase of the number of elements of the adjusting apparatus.

Further, the input circuit is formed by a discrete element disposed at the outside of an integrated circuit (IC) in order to obtain a resistance value with a high accuracy. Thus, there also arises a problem that the IC requires another pin for applying a signal to the discrimination circuit disposed within the IC and so two pins in total are required for the cut-off adjustment and the drive adjustment.

Furthermore, there is a problem that it is troublesome to adjust the white balance in the manufacturing line. That is, conventionally, a measuring and adjusting computer is disposed in the manufacturing line and the wiring and adjusting operation is performed for each IC conveyed along the manufacturing line.

Further, since the white and black signals are required to be supplied to the IC at the time of adjusting the white balance, conventionally it is required to dispose a test signal generating apparatus at the manufacturing line so that the white and black signals are supplied to the IC from the outside. Thus, an amount of work at the manufacturing line increases and so the white balance adjustment is more troublesome.

BRIEF SUMMARY OF THE INVENTION

The present invention has been performed in order to solve the aforesaid problems and an object of the present invention is to provide a white balance adjusting apparatus which can easily perform the cut-off adjustment and the drive adjustment in the manufacturing line.

A white balance adjusting apparatus according to a first aspect of the present invention is a white balance adjusting apparatus for performing cut-off adjustment and drive adjustment for each of primary color signals of red, green and blue, comprising:

three DC adjusting circuits for adjusting DC levels of the primary color signals of red, green, blue and three AC adjusting circuits for adjusting AC levels of the primary color signals of red, green, blue, respectively;

three drive transistors for amplifying the primary color signals of red, green, blue, respectively and driving an image display unit;

a variable impedance means coupled to the three drive transistors and arranged to have at least two resistance values;

a switch means for switching the resistance value of the variable impedance means;

a reference voltage source for generating a first reference voltage at a time of performing the cut-off adjustment and generating a second reference voltage at a time of performing the drive adjustment;

a comparator for comparing levels between the reference voltage of the reference voltage source and a terminal voltage of the variable impedance means; and a control circuit for generating a control signal for adjusting white balance on a basis of an output signal of the comparator and adjusting DC levels and AC levels of the primary color signals of red, green, blue by using the DC adjusting circuits and the AC adjusting circuits.

According to such an arrangement, both the cut-off adjustment and the drive adjustment, wherein used signal levels differ extremely therebetween, can be processed with a single input circuit and a single discrimination circuit, so that the number of the circuit elements can be reduced.

According to a second aspect of the present invention, the white balance adjusting apparatus according to the first aspect further comprising a test signal source for generating a signal for the drive adjustment and a signal for the cut-off adjustment.

According to such an arrangement, a signal source in a test line can be eliminated.

According to a third aspect of the present invention, the white balance adjusting apparatus according to the first aspect is arranged in a manner that an output value of the reference voltage source is arranged to change interlockingly with an output value of a reference voltage source of a clamp circuit for setting the levels of the video signal to a constant level.

According to such an arrangement, when the output value of the reference voltage source of the clamp circuit changes, the output value of the reference voltage source changes interlockingly therewith, so that the accurate signal for testing can be obtained.

According to a fourth aspect of the present invention, the white balance adjusting apparatus according to the third aspect is arranged in a manner that the variable impedance means includes a first resistor and a second resistance element connected in parallel with the first resistor and having a resistance value smaller than that of the first resistor, and the switch means is a switch for selectively connecting and disconnecting the second resistor to and from the first resistance element.

According to such an arrangement, the output signal level of the variable impedance means can be easily adjusted for the cut-off adjustment and the drive adjustment by merely switching the switch.

According to a fifth aspect of the present invention, the white balance adjusting apparatus according to the second aspect is arranged in a manner that the resistor is a discrete element disposed at an outside.

According to such an arrangement, since the second resistance element is disposed at the outside, it is not necessary to adjust the output value of the reference voltage sources. Further, according to such an arrangement, since it is not necessary to adjust the reference voltage sources, the reference voltage sources can be disposed within an IC.

According to a sixth aspect of the present invention, the white balance adjusting apparatus according to the second aspect is arranged in a manner that the DC adjusting circuits, the AC adjusting circuits, the comparator, the control circuit and the test signal source are integrally formed on a single substrate.

According to such an arrangement, the number of the pins can be reduced and the size of the apparatus can be miniaturized.

According to a seventh aspect of the present invention, the white balance adjusting apparatus according to the second aspect is arranged in a manner that the test signal source is disposed at a circuit disposed outside.

According to an eighth aspect of the present invention, the white balance adjusting apparatus according to the first aspect is arranged in a manner that the control circuit is a circuit disposed outside.

According to such an arrangement, the adjustment of the control circuit can be performed easily.

According to a ninth aspect of the present invention, the white balance adjusting apparatus according to the first aspect is arranged in a manner that the DC adjusting circuits, the AC adjusting circuits and the drive transistor circuits for the primary color signals of red, green, blue are operated in time sequence so that the cut-off adjustment and the drive adjustment for the primary color signals of red, green, blue are performed in time sequence.

According to such an arrangement, since the adjustment can be performed by a single variable impedance means and a single comparator, the number of the circuit elements can be reduced as compared with the case where the adjustments are performed simultaneously.

According to a tenth aspect of the present invention, the white balance adjusting apparatus according to the first aspect is arranged in a manner that the control circuit includes a latch circuit for latching three discrimination outputs for the primary colors of red, green, blue from the comparator, a timing controller for controlling latching timing of the latch circuit, and a microcomputer for generating the control signal for adjusting the white balance on a basis of an output of the latch circuit.

According to such an arrangement, since an automatic adjusting loop for adjusting the white balance can be formed, a computer for measurement and adjustment in a manufacturing line can be eliminated.

DETAILED DESCRIPTION OF THE INVENTION

The white balance adjusting apparatus according to an embodiment of the present invention will be described with reference to the accompanying drawings.

Figure 1:
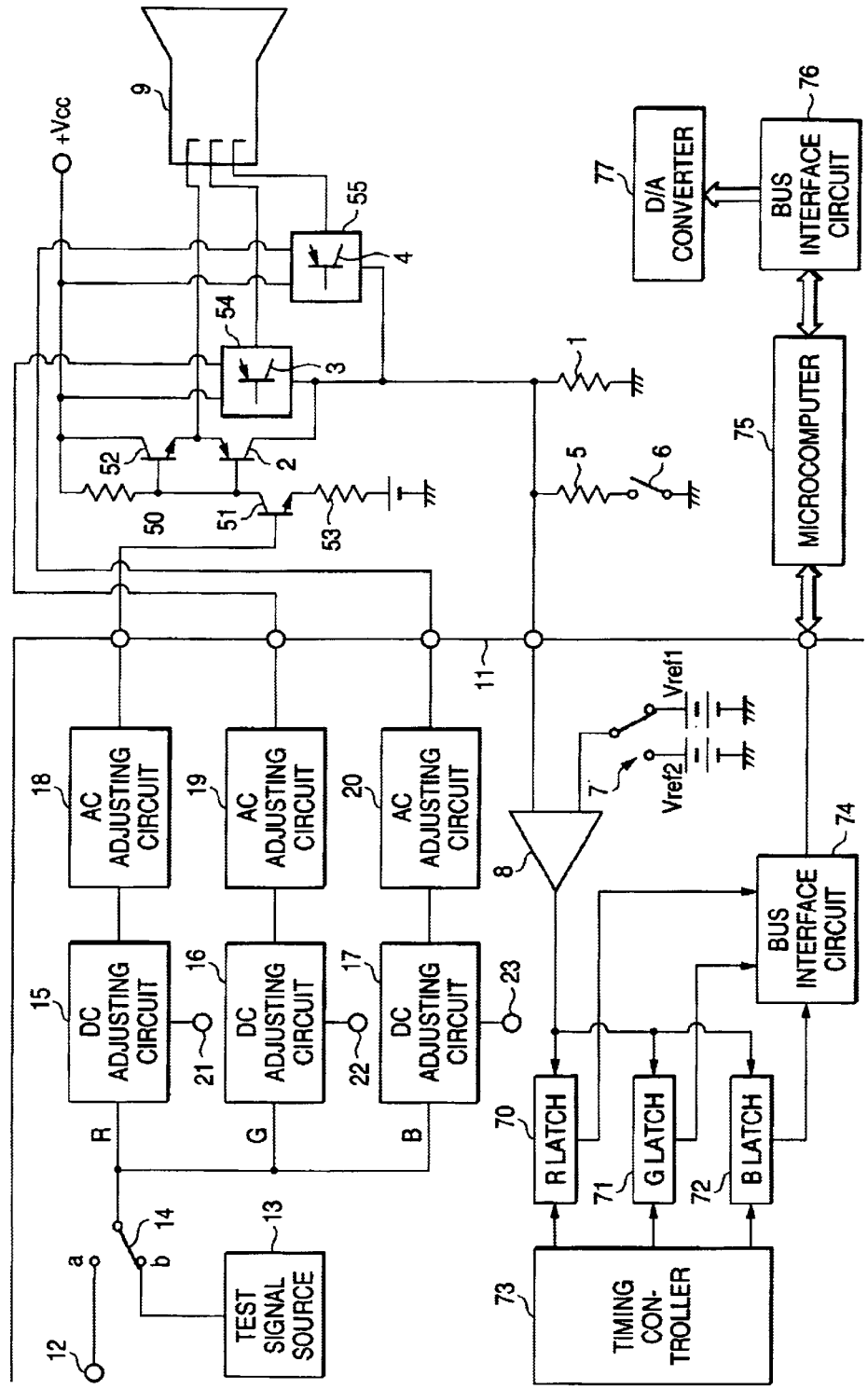
FIG. 1 illustrates a white balance adjusting apparatus according to an embodiment of the present invention.

As shown in FIG. 1, the white balance adjusting apparatus according to the embodiment of the present invention for performing the cut-off adjustment and the drive adjustment as to each of the primary colors of red, green and blue (R, G, B) comprises three DC adjusting circuits 15, 16, 17 and three AC adjusting circuits 18, 19, 20 for respectively adjusting the DC level and the AC level of each of the primary colors of R, G, B; three drive transistors 2, 3, 4 for amplifying the primary color R, G, B signals and driving an image display unit; a variable impedance means having a first resistor 1 which is connected to the three drive transistors and serves as an impedance means for converting currents flowing through the three drive transistors 2, 3, 4 for amplifying the primary color R, G, B signals into voltages, a second resistor 5 connected in parallel with the first resistor 1 and operating as an impedance means, and a switch 6 connected in series with the second resistor 5 which is selectively closed to flow the current therethrough so that the variable impedance means has two resistance values; a reference voltage source 7 for generating a first reference voltage at the time of performing the cut-off adjustment and a second reference voltage at the time of performing the drive adjustment; a comparator 8 for comparing the levels between the reference voltages of the reference voltage sources and the terminal voltage of the first or second resistor constituting the variable impedance means; and a microcomputer 75 serving as a control circuit which generates a control signal for adjusting the white balance on the basis of the output signal of the comparator and adjusts the DC level and the AC level of each of the primary colors of R, G, B by the DC adjusting circuits and the AC adjusting circuits, respectively.

The reference voltage source 7 generates a first reference voltage $V_{ref1}$ in accordance with the cut-off adjusting mode and a second reference voltage $V_{ref2}$ in accordance with the drive adjusting mode. The comparator 8 compares the levels between the terminal voltage of the first and/or second resistors obtained through the voltage conversion with the reference voltage generated by the reference voltage source. Further, the white balance adjusting apparatus includes a video signal processing IC 11, for processing an video signal displayed on a cathode ray tube 9, which has an R latch circuit 70, a G latch circuit 71 and a B latch circuit 72 for latching three discrimination outputs for R, G, B from the comparator 8, respectively.

The R latch circuit 70, G latch circuit 71, B latch circuit 72 are controlled in their timings for latching the three discrimination outputs by a timing controller 73. The latched signals from the R latch circuit 70, G latch circuit 71, B latch circuit 72 are inputted through a bus interface circuit 74 into the microcomputer 75, which in turn generates a control signal for adjusting the white balance on the basis of the output signal from the bus interface circuit 74 thereby to adjust the DC level and the AC level of each of the primary color R, G, B signals. A reference numeral 76 depicts a bus interface circuit and 77 a digital to analog (D/A) converter.

The driving circuit 50 for the cathode ray tube 9 includes the drive transistor 2, a transistor 51, a transistor 52, a resistor 53 or the like. Each of the driving circuit 54 and the driving circuit 55 has the circuit configuration similar to that of the driving circuit 50. The microcomputer 75 is originally used for selecting channels for a television receiver and for transferring data through a bus line, and in this case the microcomputer is used for adjusting the white balance by using such an original function.

The normal image display operation of the white balance adjusting apparatus will be explained prior to the explanation of the adjusting operation of the white balance thereof.

A luminance signal is applied to an input terminal 12 of the image signal processing IC 11. A test signal source 13 generates a black signal and a white signal used for the adjustment of the white balance. In the normal image display operation, a switch 14 is switched to a terminal a side instead of a terminal b side shown in the figure. The luminance signal is applied to the DC adjusting circuit 15 for the primary color R signal, the DC adjusting circuit 16 for the primary color G signal and the DC adjusting circuit 17 for the primary color B signal in each of which the DC level of the three primary color signal is adjusted. The output signals of the DC adjusting circuits 15, 16, 17 are applied to the AC adjusting circuits 18,.19, 20 and amplified with certain AC gains, respectively.

In this manner, the DC level and the AC level of each of the three primary color R, G, B signals are controlled so as to adjust the white balance. The three primary color R, G, B signals are applied to the base electrodes of the drive transistors 2, 3, 4 which in turn drive the corresponding cathode electrodes of the cathode ray tube 9, respectively.

The adjusting operation of the white balance of the white balance adjusting apparatus will be explained. In this operation, the switch 14 is switched to the terminal b-side as shown in the figure. The test signal source 13 generates the black signal for testing at the time of performing the cut-off adjustment and the white signal for testing at the time of performing the drive adjustment.

In the case of performing the cut-off adjustment, the black signal is applied to the DC adjusting circuits 15, 16, 17. The cut-off adjustment is performed by adjusting the three colors R, G, B in time sequence. To be more concrete, supposing that the primary color R signal is adjusted first, only a signal path formed by the DC adjusting circuit 15, the AC adjusting circuit 18 and the drive transistor 2 is operated, while the signal paths for other primary color G, B signals are supplied with blanking signals and so placed in inoperative states. The blanking signals are supplied to terminals 21, 22, 23. In the case of adjusting the primary color R signal, the blanking signals are supplied to the terminals 22, 23. thereby to place the drive transistors 3, 4 in off states.

The initial values of the DC adjusting circuits 15, 16, 17 and the AC adjusting circuits 18, 19, 20 are set by the microcomputer 75. That is, the microcomputer 75 applies suitable values to the DC adjusting circuits 15, 16, 17 and the AC adjusting circuits 18, 19, 20 through the bus interface circuit 76 and the D/A converter 77. The initial values are applied during the 17-th line (that is, 17-th horizontal synchronizing line from the vertical synchronizing signal), 18-th line, 19-th line within the blanking period of the vertical synchronizing signal, for example. That is, the microcomputer 75 applies adjusting digital data for the initial values to the D/A converter 77 through the bus interface circuit 76. The bus interface circuit 76 and the D/A converter 77 may be incorporated within the video signal processing IC 11.

The D/A converter 77 includes six D/A converters which correspond to the DC adjusting circuits 15, 16, 17 and the AC adjusting circuits 18, 19, 20, respectively. The initial values are respectively set in the DC adjusting circuits 15, 16, 17 and the circuits 18, 19, 20 in time sequence during the 17-th, 18-th and 19-th lines. In general, the 17-th, 18-th and 19-th lines can be obtained easily from a vertical count down circuit (not shown) contained within the image signal processing IC 11. The vertical count down circuit is formed by a frequency divider for frequency-dividing the horizontal synchronizing signal in response to the vertical synchronizing signal serving as a reset signal and a logic circuit for logically composing the frequency-divided output signal from the frequency divider.

The current flowing through the collector-emitter path of the drive transistor 2 flows into the first resistor 1 and converted into a voltage. Since the amount of the current flowing into the first resistor is small at the time of performing the cut-off adjustment, an impedance value of the variable impedance means is required to be large in order to obtain a sufficient converted voltage value. To this end, the switch 6 is opened, whereby the small current can be converted into the voltage of a desired level capable of being discriminated without any trouble. The reference voltage source 7 selects and generates the first reference voltage $V_{ref1}$ suitable for discriminating the small voltage.

In this case, each of the first resistor 1 and the second resistor 5 is required to have accurate resistance value since these resistors convert the small current into a voltage. In general, when a resistor is formed within an IC, the resistance value of the resistor likely varies due to the increase of the temperature. In contrast, when a resistor is disposed at the outside of the IC as a discrete element, the resistance value of the resistor is hardly influenced by the temperature. In view of such a fact, in the present invention, each of the first resistor 1 and the second resistor 5 is formed as a discrete element. Accordingly, accurate converted voltage value can be obtained. If the detected voltage of the variable impedance means is accurate in this manner, it becomes unnecessary to adjust the value of the reference voltage source 7, which is compared with the detected voltage. If the value of the reference voltage source 7 is not required to be adjusted, each of the first reference voltage $V_{ref1}$ and the second reference voltage $V_{ref2}$ can be formed as a fixed reference voltage source. As a result, since the fixed reference voltage source is not required to be adjusted again, the fixed reference voltage source can be easily incorporated within an IC.

Thus, the reference voltage source 7 can be incorporated within the video signal processing IC 11 and so the number of parts disposed at the outside of the IC can be reduced.

Accordingly, the comparator 8 can perform the comparison correctly and so generates the correct discrimination output signal of a "H" level or a "L" level. The discrimination output signal at the time of selecting the primary color R signal is latched by the R latch circuit 70 at the timing of the 17-th line. In the similar manner, the discrimination output signal at the time of selecting the primary color G signal is latched by the G latch circuit 71 at the timing of the 18-th line and the discrimination output signal at the time of selecting the primary color B signal is latched by the B latch circuit 72 at the timing of the 19-th line. The latch timings of these latch circuits are changed over by the timing controller 73.

When the amount of the current flowing into the collector-emitter path of the drive transistor 2 is small for each of the colors R, G, B and the terminal voltage of the first resistor is smaller than the first reference voltage $V_{ref1}$ of the reference voltage source 7, the discrimination output signals of "L", "L", "L" levels are latched in the R latch circuit 70, the G latch circuit 71, the B latch circuit 72, respectively. These data of "L", "L", "L" levels are applied to the microcomputer 75 through the bus interface circuit 74. The microcomputer 75 determines that an amount of current flowing into the collector-emitter path of the drive transistor 2 is small for each of the colors R, G, B and then applies a digital signal whose current amount is increased to the D/A converter 77 through the bus interface circuit 76. Then, the D/A converter 77 adjusts the DC levels of the DC adjusting circuits 15, 16, 17 in time sequence during the 17-th, 18-th and 19-th lines, respectively.

Thereafter, the currents which DC levels have been thus adjusted flow into the drive transistor 2 and then the aforesaid operation is performed on the basis of the currents. When the comparator 8 output "L", "L", "L" levels for the colors R, G, B, respectively, these data of "L", "L", "L" levels are applied to the microcomputer 75 which in turn determines that the adjustment of the DC levels has been completed.

In this manner, the cut-off adjustment for the primary color R, G, B signals are performed.

Incidentally, in the case of performing the cut-off adjustment for the primary color G signal, only a signal path formed by the DC adjusting circuit 16, the AC adjusting circuit 18 and the drive transistor 3 are operated, while the signal paths for other primary color R, B signals are supplied with the blanking signals and so placed in inoperative states. The blanking signals are supplied to terminals 21, 23.

In this case, the switch 6 and the reference voltage source 7 are place in the same states as the aforesaid case of the cut-off adjustment for the primary color R signal. Thus, the comparator 8 can perform the comparison correctly and so generates the correct discrimination output signal of a "H" level or a "L" level.

The cut-off adjustment for the primary color B signal is performed in the similar manner.

Then, the explanation will be made as to the drive adjustment.

In this case, the switch 14 is also switched to the terminal b-side as shown in the figure. The test signal source 13 generates the white signal for testing at the time of performing the drive adjustment.

The white signal is applied to the DC adjusting circuits 15, 16, 17. The drive adjustment is performed by adjusting the three colors R, G, B in time sequence. To be more concrete, supposing that the primary color R signal is adjusted first, only the signal path formed by the DC adjusting circuit 15, the AC adjusting circuit 18 and the drive transistor 2 is operated, while the signal paths for other primary color G, B signals are supplied with the blanking signals and so placed in inoperative states. In the case of adjusting the primary color R signal, the blanking signals are supplied to the terminals 22, 23 thereby to place the drive transistors 3, 4 in off states.

The current flowing through the collector-emitter path of the drive transistor 2 flows into the first resistor 1 and converted into a voltage. Since the amount of the current flowing into the first resistor is large at the time of performing the drive adjustment, an impedance value of the variable impedance means is required to be small in order to obtain a sufficient converted voltage value. To this end, the switch 6 is closed, whereby the excessive current can be converted into the voltage of a desired level capable of being discriminated without any trouble. The reference voltage source 7 selects and generates the second reference voltage $V_{ref2}$ suitable for discriminating the large voltage.

Accordingly, the comparator 8 can perform the comparison correctly and so generates the correct discrimination output signal of a "H" level or a "L" level. In this case, in the similar manner as the cut-off adjustment, the discrimination output signals from the comparator are latched by the latch circuits and then applied to the microcomputer 75 through the bus interface circuit 74. The microcomputer 75 performs the discrimination in accordance with the latched signal thereby to adjust the gains (AC levels) of the AC adjusting circuits 18, 19, 20.

In this manner, the present invention can process both the cut-off adjustment and the drive adjustment, wherein amounts of the drive current differ extremely, with a single input circuit and a single discrimination circuit using the first resistor 1, second resistor 5, switch 6, reference voltage source 7, comparator 8 and microcomputer 75.

Figure 2:
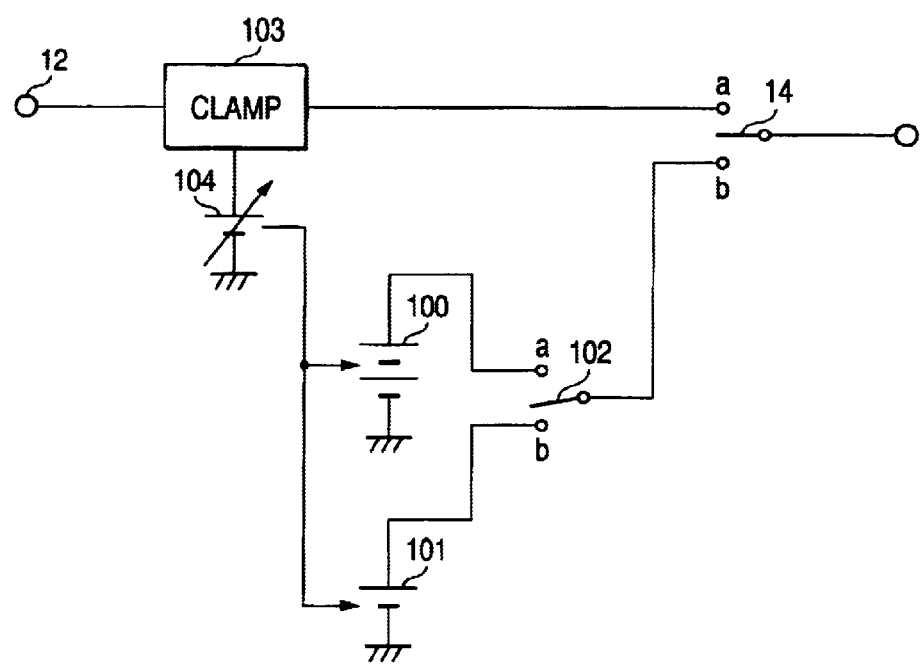
FIG. 2 illustrates an example of the concrete circuit arrangement of a test signal source used in the embodiment shown in FIG. 1.

FIG. 2 illustrates an example of the concrete circuit arrangement of the test signal source 13 shown in FIG. 1 and a peripheral circuit thereof. In the figure, a reference voltage source 100 depicts a source for generating the white signal for testing, and a reference voltage source 101 depicts a source for generating the black signal for testing. A switch 102 is switched to a terminal a side at the time of the cut-off adjustment and switched to a terminal b-side at the time of the drive adjustment. A clamp circuit 103 performs such a clamping operation that the pedestal levels of the video signal are set at a constant clamp level. The clamp level is determined in accordance with the voltage of a reference voltage source 104.

When the clamp level changes, it is required to change the black and white signals for testing.

Thus, the reference voltage source 104 is associated with both the sources 100 and 101. That is, when the output value of the reference voltage source 104 changes, the output values of the sources 100 and 101 are also changed interlockingly. As a consequence, the black and white signals for testing can be obtained correctly always.

Figure 3:
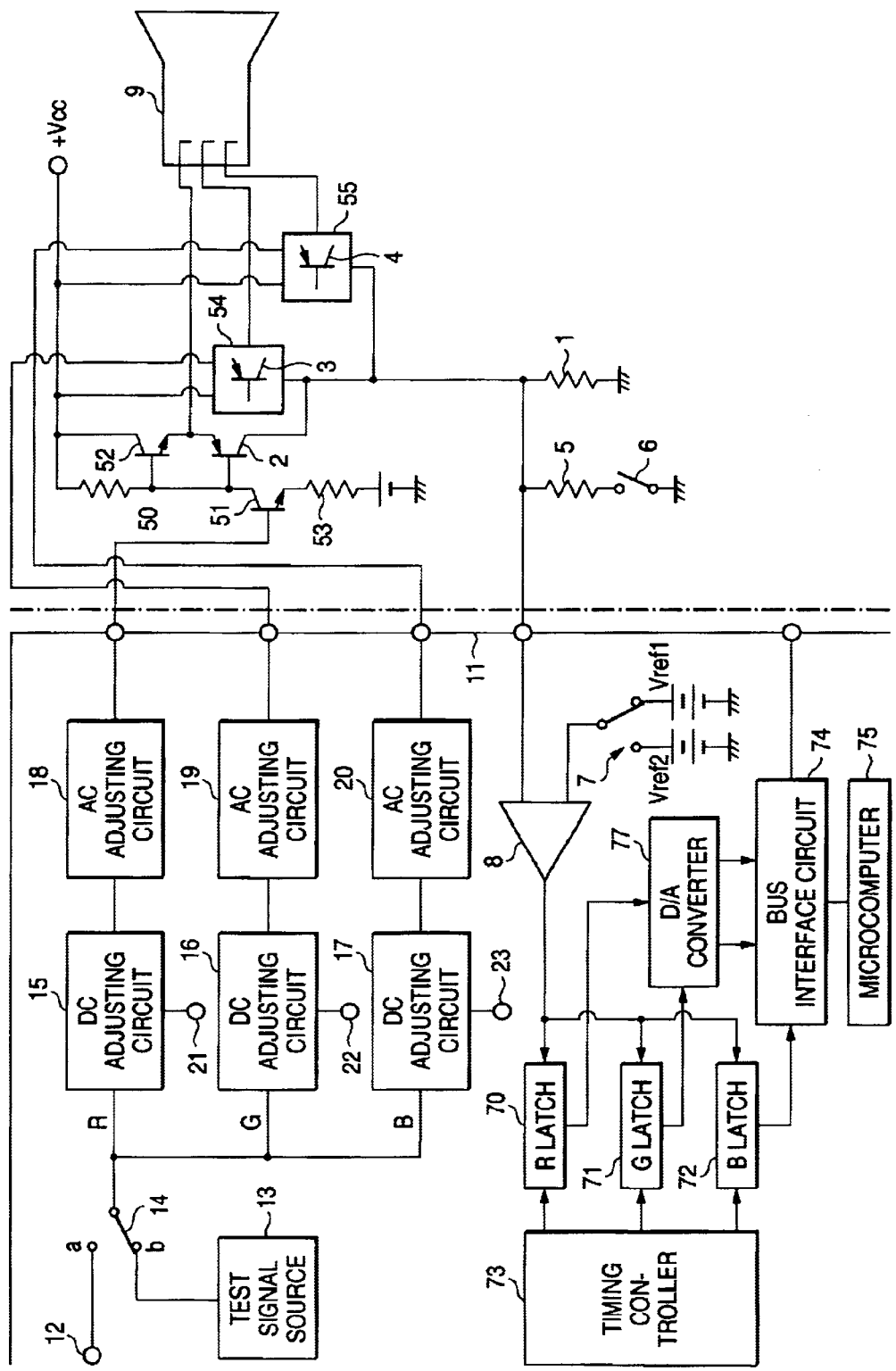
FIG. 3 illustrates a white balance adjusting apparatus according to another embodiment of the present invention.

Although, in the white balance adjusting apparatus, both the microcomputer and the D/A converter are arranged as the circuit disposed outside of the image signal processing IC, they may be integrally arranged on the same substrate as shown in FIG. 3. According to such an arrangement, it is possible to further reduce the number of the pins of the IC. In the arrangement of the embodiment shown in FIG. 3, other elements are same as those of the first embodiment shown in FIG. 1 and so the explanation thereof is omitted. According to the embodiment, it is possible to further reduce the number of the pins of the IC and to miniaturize the size of the apparatus.

Further, it is possible to employ another signal sources for testing disposed outside of the IC instead of those incorporated within the IC.

According to the present invention, both the cut-off adjustment and the drive adjustment, wherein amounts of the drive current differ extremely, can be processed with a single input circuit and a single discrimination circuit using the first resistor 1, second resistor 5, switch 6, reference voltage source 7 and comparator 8, so that not only the number of the elements of the input circuit and the discrimination circuit can be reduced but also the number of the pins of the IC can be reduced. As a consequence, the manufacturing process of a television receiver or a computer display unit using a cathode ray tube can be rationalized.

Further, according to the present invention, since the second resistor is disposed at the outside of the IC, the adjustment of the output value of the reference voltage source is not required, whereby both the first reference voltage $V_{ref1}$ and the second reference voltage $V_{ref2}$ can be obtained from the fixed reference voltage sources. Accordingly, the reference voltage sources can be incorporated within the image signal processing IC and the number of the parts disposed at the outside of the IC can be reduced while securing the necessary accuracy.

Furthermore, according to the present invention, since an automatic adjusting loop for adjusting the white balance can be formed by using the microcomputer which is originally mounted on a setting substrate of a television receiver or a computer display unit, a computer for measurement and adjustment in a manufacturing line can be eliminated.

Furthermore, according to the present invention, since the test signal source 13 is incorporated within the video signal processing IC, a test signal source in a manufacturing line can be eliminated and so the adjusting procedure can be simplified.

What is claimed is:

1. A white balance adjusting apparatus for performing cut-off adjustment and drive adjustment for each of primary color signals of red, green and blue, comprising:

three DC adjusting circuits for adjusting DC levels of the primary color signals of red, green, blue and three AC adjusting circuits for adjusting AC levels of the primary color signals of red, green, blue, respectively;

three drive transistors for amplifying the primary color signals of red, green, blue, respectively and driving an image display unit;

a variable impedance means coupled to said three drive transistors and arranged to have at least two resistance values;

a switch means for switching the resistance value of said variable impedance means;

a reference voltage source for generating a first reference voltage at a time of performing the cut-off adjustment and generating a second reference voltage at a time of performing the drive adjustment;

a comparator for comparing levels between the reference voltage of said reference voltage source and a terminal voltage of said variable impedance means; and a control circuit for generating a control signal for adjusting white balance on a basis of an output signal of said comparator and adjusting DC levels and AC levels of the primary color signals of red, green, blue by using said DC adjusting circuits and said AC adjusting circuits.

2. A white balance adjusting apparatus according to claim 1, further comprising a test signal source for generating a signal for the drive adjustment and a signal for the cut-off adjustment.

3. A white balance adjusting apparatus according to claim 1, wherein an output value of said reference voltage source is arranged to change interlockingly with an output value of a reference voltage source of a clamp circuit for setting the levels of the video signal to a constant level.

4. A white balance adjusting apparatus according to claim 3, wherein said variable impedance means comprises: a first resistor and a second resistor connected in parallel with said first resistance element and having a resistance value smaller than that of said first resistor; and said switch means is a switch for selectively connecting and disconnecting said second resistor to and from said first resistor.

5. A white balance adjusting apparatus according to claim 4, wherein said second resistance element is a discrete element disposed at an outside.

6. A white balance adjusting apparatus according to claim 2, wherein said DC adjusting circuits, said AC adjusting circuits, said comparator, said control circuit and said test signal source are integrally formed on a single substrate.

7. A white balance adjusting apparatus according to claim 2, wherein said test signal source is disposed at an outside of the apparatus.

8. A white balance adjusting apparatus according to claim 1, wherein said control circuit is a circuit disposed outside of the apparatus.

9. A white balance adjusting apparatus according to claim 1, wherein said DC adjusting circuits, said AC adjusting circuits and said drive transistor circuits for the primary color signals of red, green, blue are operated in time sequence so that the cut-off adjustment and the drive adjustment for the primary color signals of red, green, blue are performed in time sequence.

10. A white balance adjusting apparatus according to claim 1, wherein said control circuit comprises a latch circuit for latching three discrimination outputs for the primary colors of red, green, blue from said comparator, a timing controller for controlling latching timing of said latch circuit, and a microcomputer for generating the control signal for adjusting the white balance on a basis of an output of said latch circuit.

* * * * *